United States Patent [19]

Yoshizawa

[11] Patent Number: 4,788,678

[45] Date of Patent: Nov. 29, 1988

[54] OPTICAL INFORMATION RECORDING MEDIA SUBSTRATE

[75] Inventor: Akihiko Yoshizawa, Hachioji, Japan

[73] Assignee: Olympus Optical Co., Ltd., Tokyo, Japan

[21] Appl. No.: 932,428

[22] Filed: Nov. 19, 1986

[30] Foreign Application Priority Data

Nov. 20, 1985 [JP] Japan .................... 60-260615

[51] Int. Cl.⁴ .................... G11B 7/24; G11B 5/84
[52] U.S. Cl. .................... 369/284; 369/110; 369/286; 369/288
[58] Field of Search .................... 369/44, 45, 46, 110, 369/284, 285, 286, 288

[56] References Cited

U.S. PATENT DOCUMENTS 4,037,929  7/1977  Bricot et al. .................... 369/110
4,551,733  11/1985  Cornet et al. .................... 369/284

FOREIGN PATENT DOCUMENTS 57-74701  5/1982  Japan .
8200393  9/1982  Netherlands .................... 369/284

Primary Examiner—Steven E. Stephan
Attorney, Agent, or Firm—Armstrong, Nikaido, Marmelstein & Kubovcik

[57] ABSTRACT

An optical information recording media substrate made of a plane shaped molded object using thermo-plastic resin possessing optical anisotropy. A light beam is condensed in the direction perpendicular to the plane surface, transmitted through the plane surface and led to a recording media surface on which a recording media is formed. The direction of the optic axis of the light beam is set parallel to that of the plane surface to diminish the deterioration of the C/N ratio of the reproduced signal.

5 Claims, 10 Drawing Sheets

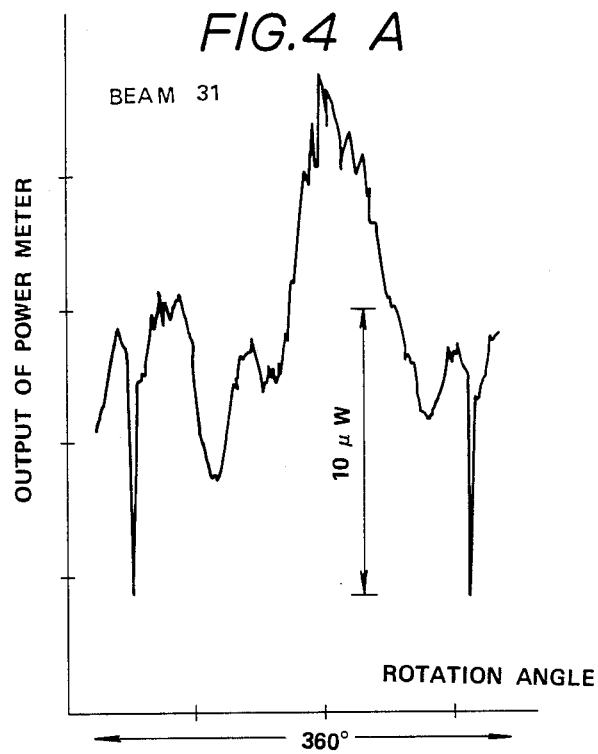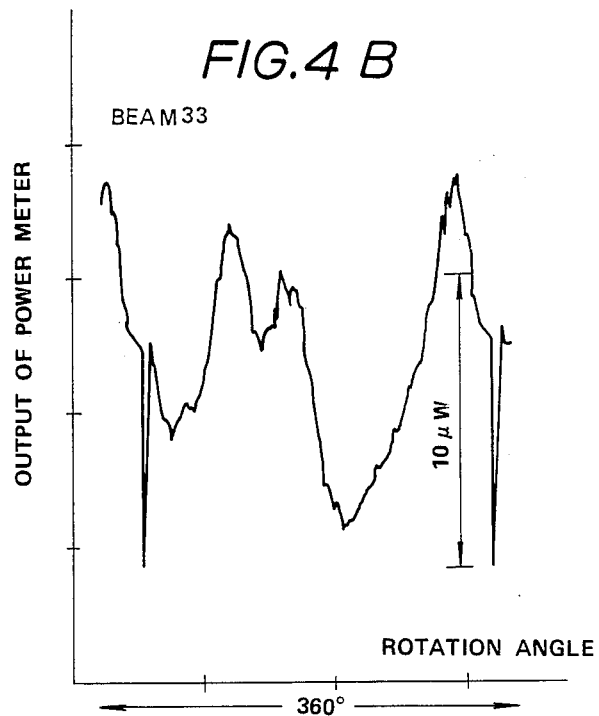

OPTICAL INFORMATION RECORDING MEDIA SUBSTRATE

FIELD OF THE INVENTION AND RELATED ART STATEMENT

The present invention relates to an optical information recording media substrate used for recording, reproducing, or erasing information by means of irradiating light beam from an optical pickup.

Heretofore acrylic resin such as PMMA and the like has often been used for the optical information recording media substrate of such optical information recording and reproducing devices as optical disc devices, magneto-optical disc devices, etc. This is due to the fact that, as is shown in Japan Utility Model Disclosure No. 57-74701, it has been generally considered that acrylic resin has an excellent optical characteristics and is best suited for heightening the C/N ratio of the reproduced signals. But acrylic resin also possesses a defect that the media itself is warped due to its great hygroscopicity.

On the other hand, in recent years polycarbonate (hereafter abbreviated as PC) resin has come to be noticed as the substrate for such information recording media. PC resin is resistant to warp, and in this respect it has an excellent characteristic compared with acrylic resin. However, the actual circumstance is that its optical characteristics are not sufficiently good and it is difficult to obtain high C/N reproduced signals.

That is to say, although acrylic resin has excellent optical characteristics its highgroscopicity is great, and when adopted as an optical information recording media substrate, acrylic resin has defects of easily causing deformation and distortion on the optical information recording media. On the other hand, PC resin has had, notwithstanding its fine mechanical strength and forming stability, unsolved problems of its optical characteristics that the shot noise of detector increase because the rate of light passing through analyzer due to double refraction increases and that the C/N ratio deteriorates.

OBJECT AND SUMMARY OF THE INVENTION

An object of the present invention is to provide an optical information recording media substrate capable of obtaining reproduced signals of high C/N ratio even when employing such thermal plastic resin having double refraction as PC resin.

Another object is to provide an optical information recording media substrate suited for the information recording media, particularly those adopting magneto-optical system.

With respect to a flat optical information recording media substrate for which thermal plastic resin having optical anisotropic characteristics is used and into which a condensed light beam is transmitted and led to the recording media plane, the present invention has so contrived that the direction of the optic axis is approximately parallel to the surface of the substrate, and in the case of a disc, the direction of the optic axis is furthermore arranged in approximately radial direction.

BRIEF DESCRIPTION OF THE DRAWINGS

FIG. 1 through FIG. 13 relate to an embodiment of the present invention wherein:

FIG. 1 is a perspective view illustrating the paths of the beam when a light beam is condensed on a substrate.

FIG. 2 is a perspective view illustrating the paths of the beam in the beam transmitting plane of the substrate.

FIG. 3 is a schematic constitutional view of the measuring device for the measurement of the effect of light beam.

FIG. 4A through FIG. 4D are characteristics diagram showing the extinction level of each beam obtained in the measuring device shown in FIG. 3.

FIG. 5 is a perspective view illustrating the relationship between the polarized planes before and after the refraction caused by an incident light beam on the medium.

FIG. 7 is a diagram of measured results showing the variation of the quantity of light in the direction of the minor axis obtained from the measuring device shown in FIG. 6A.

FIG. 8 is a graph showing the relationship between $\Psi$ and I taking $\Phi$ obtained from the theoretical formulas as a parameter.

FIG. 9 is a graph showing the relationship between $\Psi$ and I obtained from theoretical formula taking Ne as a parameter.

FIG. 10 is a perspective view illustrating the relationship between a PC substrate and an optic axis.

FIG. 11 is a graph showing the measured results of the degree of ellipticity in the comparative example and the embodiment.

FIG. 12 is a schematic constitutional view of the measuring device of noise level of the substrate.

FIG. 13 is a graph showing the measured results of the noise level obtained from the measuring device shown in FIG. 12.

DETAILED DESCRIPTION OF PREFERRED EMBODIMENTS

Figure 1:
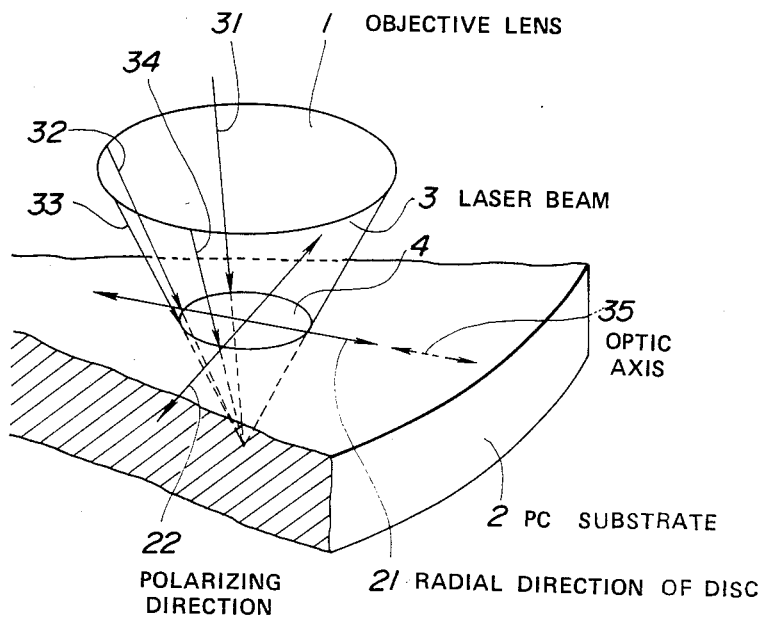

Before getting to the description of the present invention, an outline of the progress of the invention will be described as follows.

Generally speaking, in an optical information recording and reproducing device, a laser beam about 4 to 5 mm in diameter emitted from a semiconductor laser, or a light source, is condensed by a lens and focused into a spot 1 $\mu$m in diameter. Consequently, if a lens of numerical aperture (NA), for example 0.5, is used, the condensed laser beam is irradiated on the information recording media by an incidence angle of 30° at its maximum. On the other hand, as for the information recording and reproducing device utilizing magneto-optical effect, the laser beam whose polarized plane reflected from the information recording medium is rotated by a small angle, which is detected by an analyzer to provide with reproduced signals. Therefore, as previously described, in the case the condensed laser beam is not perpendicularly incident on the information recording medium, there exists polarized light of an intermediate state containing P polarized light and S polarized light components, and linearly polarized light tends to become elliptically polarized, and as a result the noise level is heightened to deteriorate the C/N ratio of the reproduced signals. Moreover, the abovementioned tendency to elliptically polarized light also occurs in other types of optical information recording and reproducing devices using circularly polarized light (for instance DRAW system), which causes the deterioration of the C/N ratio of the reproduced signals. For such a case, material like polycarbonate in which the existence of some amount of double refraction is inevitable, rather than to contrive a method of entirely eliminating double refraction, it is considered as practically profitable to manufacture the substrates for media so that the axis in which the refractive indexes for ordinary and extraordinary rays coincide (hereafter described as optic axis, as is well known), becomes the direction in which the influence on the C/N ratio of the reproduced signals is minimized. Based on this consideration, as will be described later in detail, a substrate for media made of resin possessing double refraction is so manufactured that the optical axis is parallel to the plane of the substrate and at the same time each axis is directed in the radial direction of a disc shaped substrate, and as a result reproduces signals of high C/N ratio are achieved.

The present invention will now be described with reference to the drawings in the following.

For the purpose of knowing the optical characteristics of the substrate for information recording media using PC resin (hereafter described as PC substrate), the degree of double refraction has been measured by a light beam vertically incident on the substrate. As for the result it has been surmised that the degree of double refraction of the PC substrate would be fairly small, and that by using PC substrate the reproduced signal, whose C/N ratio is comparable to that of the substrate using acrylic resin should be obtained. But the measured results showed that the obtained C/N ratio was considerably smaller than the one actually obtained by using PC substrates.

Therefore, noticing the fact that, in the actual optical information recording and reproducing device a light beam is condensed by a lens that causes the existence of obliquely incident light in addition to vertically incident light, the influence of the obliquely incident light has been confirmed experimentally.

Figure 2:
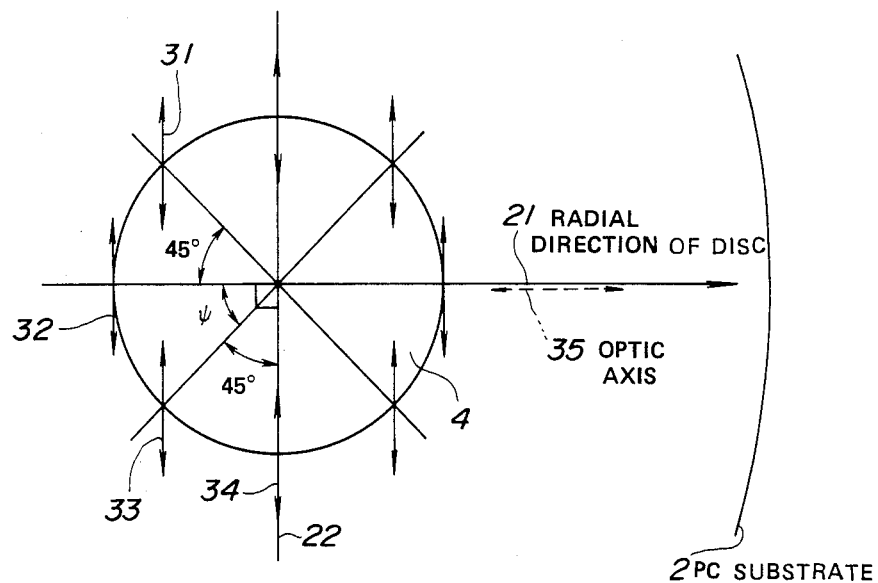

FIG. 1 and FIG. 2 show the paths of the light beam condensed by lens.

FIG. 1 is a perspective view showing a laser beam 3 being focused by an objective 1 and irradiated as a spot on a portion of a PC substrate 2. In the figure, the PC substrate 2 is illustrated as only a portion of a disc. Moreover, since a so-called magneto-optical disc device utilizing magneto-optical effect is assumed in the illustration shown in the figure, the laser beam 3 crosses the radial direction of the disc 2 (marked 21 in the figure) at right angle, and is a linearly polarized light parallel to the disc 2 (the direction marked by 22 in the figure shows the direction of polarization). The laser beam 3 incident on a beam transmitting surface 4 (which allows transmission of the laser beam 3) includes beams 32 and 34 which are incident at right angle and parallel respectively against the direction of the linearly polarized light, and also beams 31 and 33 which are incident making an angle of 45° with respect to the beams 32 and 34.

Furthermore, as will be described later, the direction of the optic axis (marked by 35) is, in the disc of the embodiment, set parallel to the radial direction.

FIG. 2 is a perspective view showing the behavior of the beam transmitting surface of the disc 2. The reference signs identical to those in FIG. 1 designate the identical elements. In the figure, the arrows attached to the beams 31, 32, 33, and 34 indicate the directions of the vibration of the linearly polarized light. The beams 32 and 34 are incident on the beam transmitting surface 4 at right angle and parallel respectively against the incident plane to become S-polarized light and P-polarized light, respectively. While the beams 31 and 33 are incident on the beam transmitting surface from the directions at 45° with respect to the beams 32 and 34 as shown in FIG. 1, and as a result they become polarized light including both of the P-polarized light and S-polarized light components. In the figure, $\Psi$ shows the angle between the incident plane and the radial direction (in the figure, $\Psi=45°$). In order to measure the influence and the like of the obliquely incident light on such a substrate, the effects of each beams 31, 32, 33, and 34 are measured independently.

Figure 3:
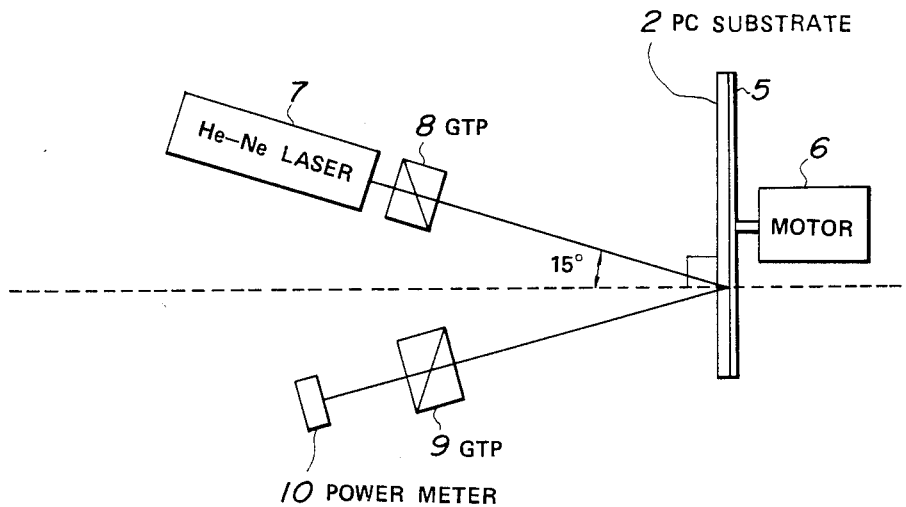
Figure 4C:
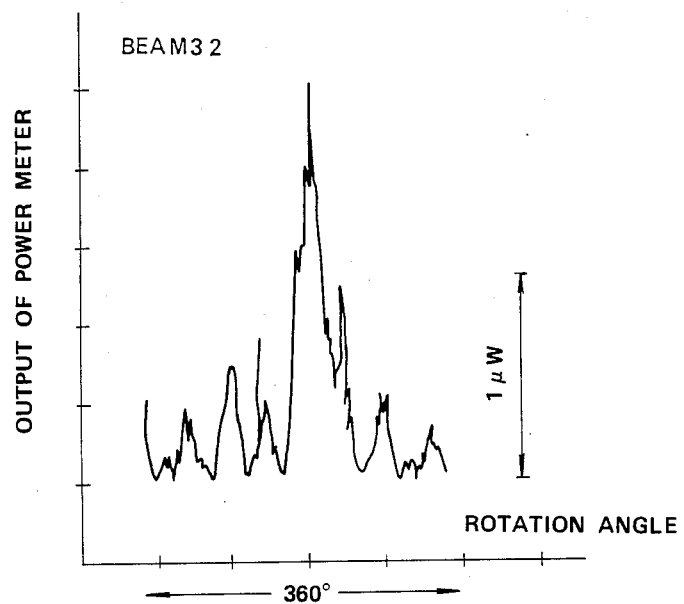
Figure 4D:
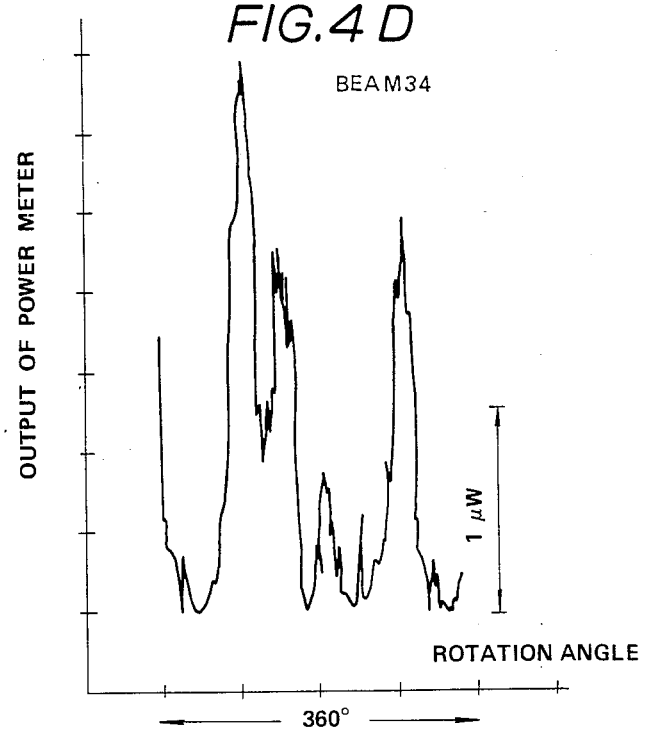

FIG. 3 shows a schematic constitutional view of the measuring device for the measurement of the effects of each of the above-mentioned light beams. The PC substrate provided with a reflector film 5 on its reverse side is rotated by a motor 6. The laser beam emitted from a He-Ne laser 7 in a form of linearly polarized light is incident obliquely on the PC substrate 2 via a Glan-Thompson prism (hereafter abbreviated as GTP) 8.

The laser beam reflected by the reflecting film 5 is detected by a power meter 10 via a GTP9. The GTP9 is placed in a state of crossed nicols with respect to the GTP8. Here, when the GTP8 is rotated, the direction of the incident plane of the laser beam incident on the PC substrate 2 can be varied (it corresponds to the variation of the angle $\Psi$ in FIG. 2), so that by means of prescribed angle setting laser beams corresponding to beam 31 through 34 can be generated independently. In this case the PC substrate 2 is fabricated by injection molding, which is the same way as in the following description of the embodiment.

According to the above-mentioned measuring device, firstly the GTP8 is set at the angle corresponding to the incident plane of the laser beam 31, and the output of the power meter 10 is measured during the period corresponding to one rotation of the PC substrate 2. Secondly, the angular positions of the GTP8 are successively switched to the angles corresponding to the beams 32, 33, and 34, and similar measurements are done.

Furthermore, the incident angle of the light beam to the substrate 2 is set at 15° as indicated in the figure, which shows an example corresponding to the description that, with respect to the previous description of the lens, its NA is equal to 0.5 and its maximum angle of incidence is 30°.

FIG. 4A through FIG. 4D show the measured results obtained by the above-mentioned measuring device with respect to the beams 31, 33, 32, and 34 respectively. In the figure, the ordinate is the output of the power meter (10 in FIG. 3), which is the outputs of the reflected light at its extinction position (hereafter described as extinction level). The abscissa is the rotation angle of the PC substrate 2, and the arrow in the figure corresponds to one rotation of the substrate.

From the measured results of FIG. 4, it is seen that, the variation of extinction level is small for the beam 32 of S-polarized light and the beam 34 of P-polarized light, while that of the beams 31 and 32 that include both of P- and S-polarized light components is about 10 times as the previous one. Such a variation of extinction level relates to the degree of ellipticity of the laser beam. Therefore it is conceivably understood from these results that the degree of ellipticity by the PC substrate is a function of the direction (angle $\Psi$) of the incident plane of the laser beam to the substrate.

Consequently, with respect to this point, a theoretical analysis will be made referring FIG. 5 as follows.

Figure 5:
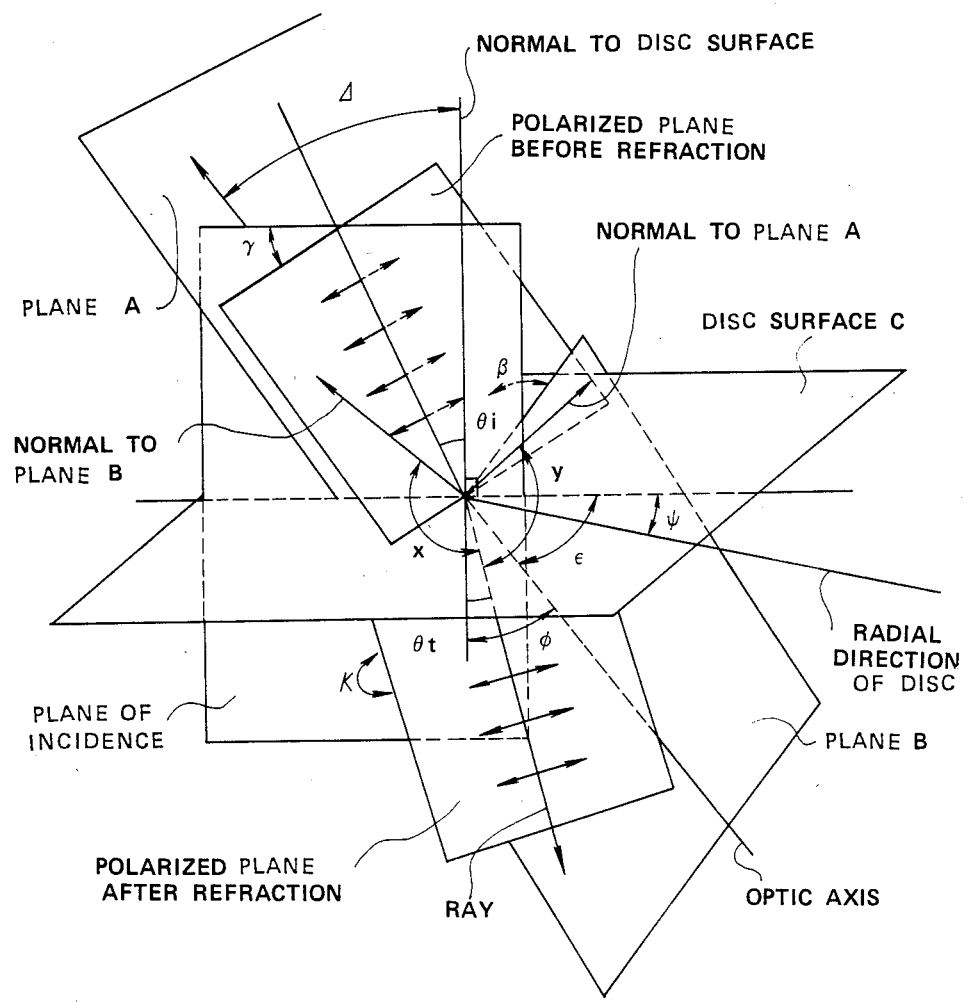

FIG. 5 is a perspective view showing the variation of the polarized plane in the case of incident light beam on a medium. The plane A is a plane that includes the optic axis and is perpendicular to the incident plane (plane of incidence) and the plane B a plane that includes the light after refraction and the optic axis.

After the refraction of the light beam incident on a medium, let the angle between the polarized plane and optic axis, looked from the direction of light, be $\theta$, the incident angle be $\theta_i$, and the angle between the incident plane and the radial direction be $\Psi$. Further, the other angles are defined as follows.

$\epsilon$: the angle between the optic axis and the incident plane.
$\gamma$: the angle between the polarized plane and the incident plane before refraction.
k: the angle between the polarized plane and the incident plane looked from the direction of light after refraction.
$\beta$: the angle between the optic axis and the incident plane looked from the direction of light after refraction.
$\theta_t$: the angle between the normal to boundary surface and the direction of light after refraction, where $$\theta = \beta + k \quad (1)$$

on the other hand, k is obtained from $\gamma$, $\theta_i$, $\theta_t$, and Fresnel's Formula as follows $$\tan k = \cos(\theta_i - \theta_t) \cdot \tan \gamma$$

hence $$k = \tan^{-1}\{\cos(\theta_i - \theta_t) \cdot \tan \gamma\} \quad (2)$$

Assuming that the optic axis is inclined, in the plane perpendicular to the boundary surface (or disc surface) C including the radial direction, with respect to the boundary surface C by an angle of certain degrees, let the angle between the normal to the boundary surface C by an angle of certain degrees, let the angle between the normal to the boundary surface C and the optic axis be $\Phi$, then the relation between $\Phi$, $\Psi$, and $\epsilon$ is given by $$\sin \epsilon = \sin \Phi \cdot \sin \Psi \quad (3)$$

Where, let the angle between the plane vertical to the incident plane including the optic axis and the normal to the boundary surface C be $\Delta$, then the relation between $\Delta$, $\epsilon$, and $\Psi$ is given by $$\sin \Delta = \frac{\tan \epsilon}{\tan \Psi} \quad (4)$$

Further, let the angle between the perpendicular (within the incident plane to the plane) perpendicular to the incident plane including the optic axis and the direction of light after refraction, by $\gamma$, then the relation between $\beta$, $\epsilon$, and $\gamma$ is given by $$\tan \beta = \tan \epsilon \cdot \frac{1}{\cos y}$$

that is, from $$y = \left\{ \frac{\pi}{2} - (\theta_t + \Delta) \right\}$$

$$\tan \beta = \tan \epsilon \cdot \frac{1}{\sin(\theta_t + \Delta)} \quad (5)$$

from equations (4), (5), and (6)

$$\tan \beta = \frac{\sin \Psi \cdot \sin \Phi}{\sin \theta_t \cdot \cos \Phi + \cos \theta_t \cdot \cos \Psi \cdot \sin \Phi} \quad (6)$$

is obtained.

Assuming that the polarized plane before being converged is perpendicular to the radial direction $$\tan y = \frac{\tan\left(\frac{\pi}{2} - \Psi\right)}{\cos \theta_1} \quad (7)$$

therefore from equations (2), (3), (7) and (8) $\theta$ is obtained as follows.

$$\theta = \tan^{-1}\left( \frac{\sin \Psi \cdot \sin \Phi}{\sin \theta_t \cdot \cos \Phi + \cos \theta_t \cdot \cos \Psi \cdot \sin \Phi} \right) + \tan^{-1}\left\{ \frac{\cos(\theta_1 - \theta_t)}{\tan \Psi \cdot \cos \theta_1} \right\} \quad (8)$$

where $$\theta_t = \sin^{-1}\left( \frac{\sin \theta_1}{n} \right)$$

expressing the phase difference $\alpha$ by $\theta_i$ and $\Psi$. Generally $$\alpha = \frac{2\pi}{\lambda}(n'' - n')h \quad (9)$$

where n', n'': two refractive indexes in the two mutually perpendicular directions
h: thickness
$\lambda$: wave length
Now let us consider a uniaxial crystal $$n' = n_0 \quad (10)$$

While assuming an index ellipsoid for n'', and let the angle between the optic axis and the direction of light be x, then $$n'' = \frac{n_e \cdot n_0}{\sqrt{n_0^2 + (n_e^2 - n_0^2)\sin^2 x}} \quad (11)$$

where $$\sin x = \cos \theta_t \cos \Phi - \cos \Psi \cdot \sin \theta_t \sin \Phi \quad (12)$$

from equations (11) and (12), $$n'' = \frac{n_e \cdot n_0}{\sqrt{n_0{}^2 + (n_e{}^2 - n_0{}^2)(\cos\theta t \cdot \cos\Phi - \cos\Psi \cdot \sin\theta t \cdot \sin\Phi}{}^2)} \tag{13}$$

therefore from equations (9), (10), and (11) the phase difference $\alpha$ is obtained as follows.

$$\alpha = \frac{2\pi}{\lambda} x \cdot$$

$$\left( \frac{n_e}{\sqrt{n_0{}^2 + (n_e{}^2 - n_0{}^2)(\cos\theta t \cdot \cos\Phi - \cos\Psi \cdot \sin\theta t \cdot \sin\Phi)^2}} - 1 \right) n_0 \cdot h \tag{14}$$

Therefore, when the optic axis is inclined by an angle of certain degrees with respect to the foundary surface in the plane perpendicular to the boundary surface including the radial direction, if a linearly polarized light having a vibrating plane parallel to the radial direction is incident on the boundary surface at a certain angle, it is seen that the transmitted light tends to have ellipticity. And the ratio of its minor to major axes is given by $$\frac{\text{major axis}}{\text{major axis}} = \sqrt{I_s} = \frac{|\sin 2\theta \cdot \sin\alpha|}{1 + \sqrt{1 - \sin^2 2\theta \cdot \sin^2\alpha}} \tag{15}$$

While $\theta$ and $\alpha$ are expressed by formulas (8) and (14), respectively, and $\theta$ and $\alpha$ are the functions of $\theta_i$, $\Psi$ and $\Phi$. Therefore once the values of $\theta_i$, $\Psi$, $\Phi$, $n_0$, and $n_e$ are determined, the degree of ellipticity, namely, the ratio of minor to major axes can be obtained.

Figure 6A:
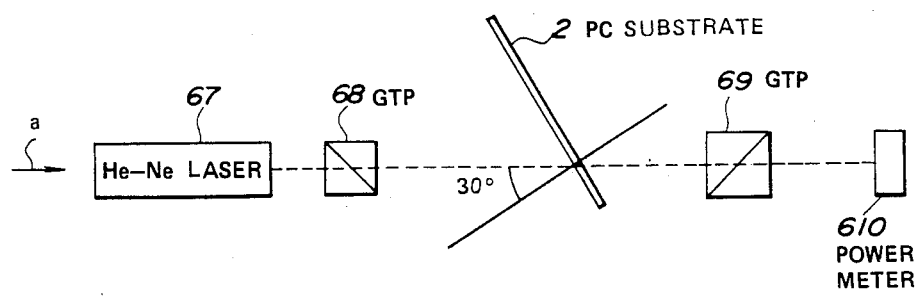
FIG. 6A is a schematic constitutional view of the measuring instrument for the measurement of the relationship between the direction of incident plane and the degree of ellipticity.
Figure 6B:
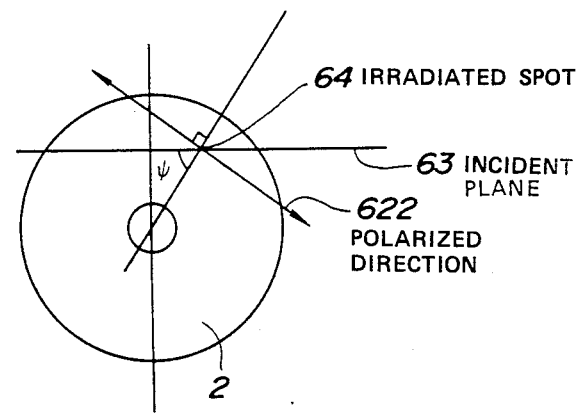
FIG. 6B is a perspective view illustrating the one shown in FIG. 6A.

Next, the relation between the degree of ellipticity due to the PC substrate and the direction of the incident plane of the laser beam incident on the PC substrate, will be obtained experimentally. FIG. 6A is a schematic constitutional view of the measuring instrument for the measurement of the relationship between the direction of incident plane and the degree of ellipticity. The laser beam emitted from a He-Ne laser 67 is irradiated on the PC substrate 2 at an incident angle of 30° via a GTP 68. The transmitted light is detected by a power meter 610 via a GTP 69. Each of the GTPs 68 and 69 are adjusted at a state of approximately crossed nicols, so that the output from the power meter 610 varies depending on the degree of ellipticity of the beam due to the PC substrate 2. FIG. 6B is a view of FIG. 6A looked from the direction a. Assuming that the polarizing direction 622 crosses the radial direction of the PC substrate at right angle and is parallel to the surface of the substrate, and defining the angle between the incident plane and the radial direction as $\Psi$. Where 63 is an incident plane and 64 is an irradiated spot. The GTP 68 on the laser side is rotated to successively vary $\Psi$, and the output of the power meter 610, or the output I in the direction of minor axis, is sought. The results are shown in FIG. 7.

Figure 7:
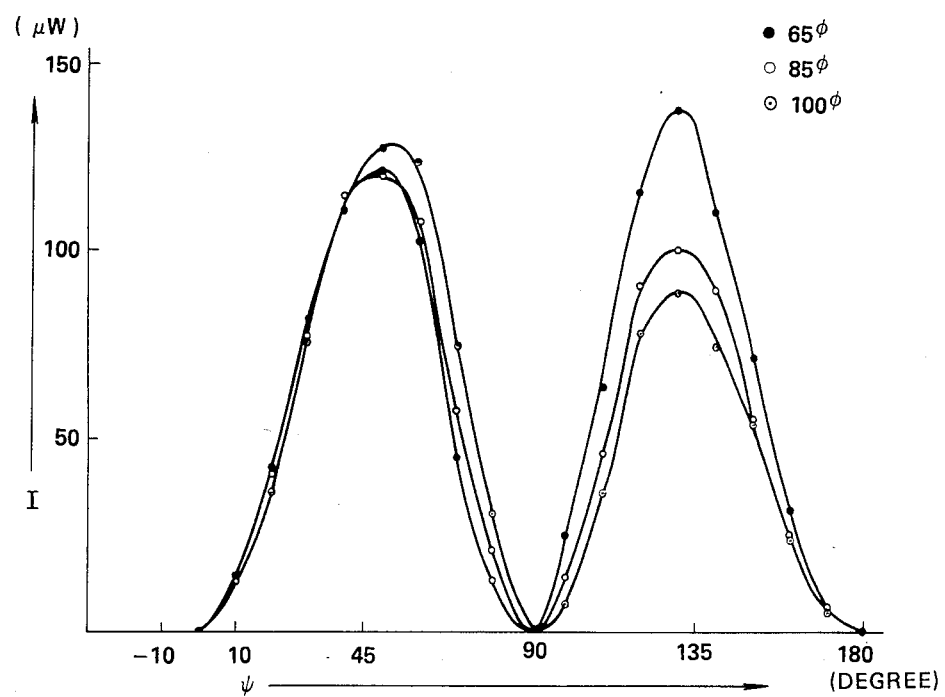

FIG. 7 shows the behavior of the intensity variation of light in the direction of the minor axis (ordinate) versus the angle $\Psi$ between the incident plane and the polarizing plane (abscissa), obtained from the measuring device shown in FIG. 6.

The behavior shown in the figure is the measured results in which the irradiated positions on the substrate by light beam are set at the points at 65 mm, 85 mm, and 100 mm, respectively, on the diameter of the substrate. Furthermore the light transmission of the substrate is set at about 1 mW at a maximum. It is seen from FIG. 7 that when $\Psi$ is set at 0° and 90° (namely, corresponding to the case of P-polarized light or S-polarized light, respectively), the output of I=0 is obtained, which shows that the ellipticity does not exist. On the other hand, when $\Psi$ is set at the angle of other values (namely, corresponding to the case in which P-polarized light and S-polarized light coexist mixedly), the degree of ellipticity is seen to be large.

Figure 8:
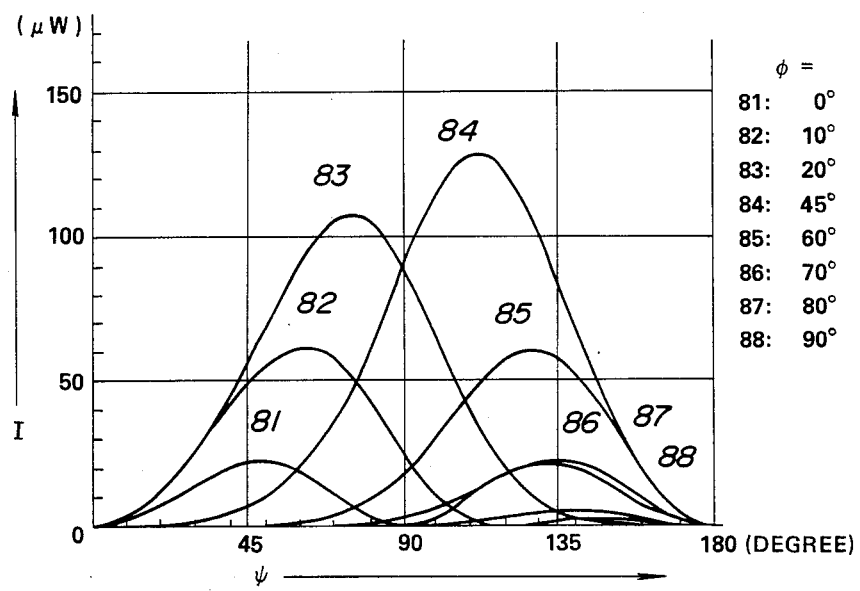
Figure 9:
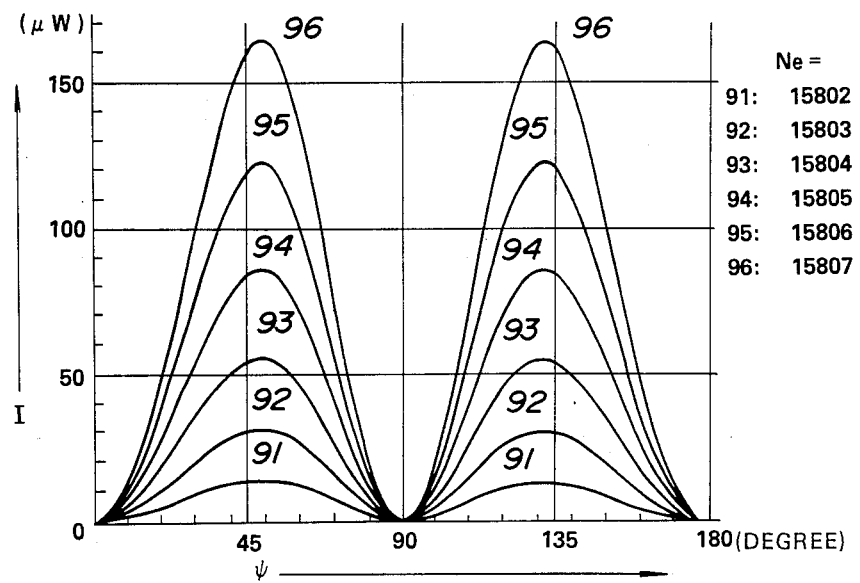

Next, adequate values are substituted in the previously described theoretical formulas and are calculated, and their results are shown in FIG. 8 and FIG. 9.

Here, in order to enable the comparison with the experimental results, formula (15) is transformed to offer the light intensity in the direction of minor axis $$I = I_0 \cdot T \tag{16}$$

to make the conditions coincide with the experiments, let $I_0 \cdot T = 1$ mW, then $$I = \frac{I_s}{T + I_s} \tag{17}$$

is obtained, where, $I_0$ is the intensity of incident light, and T is the transmittance.

FIG. 8 is a graph showing the calculated results of the relationship between I and $\Psi$ when $\Phi$ is varied using the previously written theoretical formulas (8), (14), (15), and (71).

In the figure, the values of $\theta i$, $n_0$, and $n_e$ are set as $\theta i = 30°$, $n_0 = 1.58000$, and $n_e = 1.58025$. The case in which $\Phi$ is varied from 1° (81 in the figure) through 90° (88 in the figure) in shown in the figure. It is seen from the figure that the case in which $\Phi = 0°$, namely the behavior marked by 81 in the figure is close to the actually measured results using the PC substrate.

FIG. 9 is a graph showing the results, obtained from the theoretical formula as in the case of FIG. 8, of the relationship between I and $\Psi$ when $n_e$ is varied. That is, it shows the case in which, letting $\theta_i = 30°$, $n_0 = 1.58000$, and $\Phi = 0°$, and $n_e$ is varied from 1.54802 (marked 91 in the figure) through 1.5807 (96 in the figure). From the figure, it is seen possible to almost reproduce the actual measuring conditions of the PC substrate shown in FIG. 7 by selecting adequate values of $n_e$.

Figure 10:
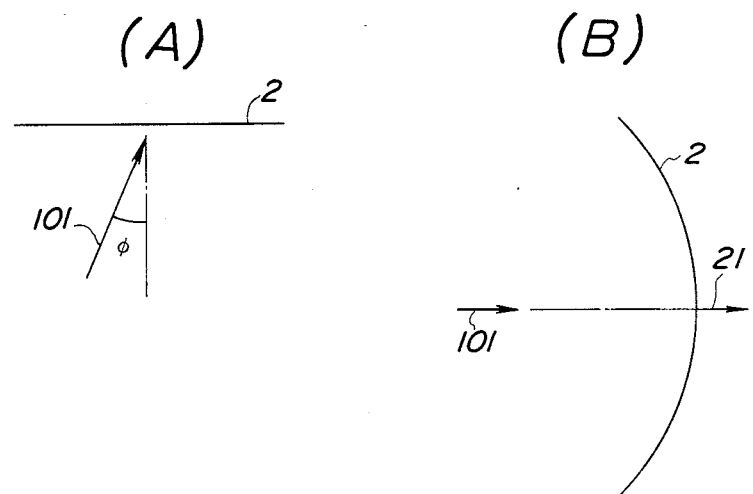

The above-mentioned results will be described as follows referring to FIG. 10. As for the ordinary PC substrate 2 it is seen that its optic axis is situated within the plane perpendicular to the surface of the substrate surface including the radial direction 21, and that the angle between the perpendicular to the substrate surface and the optic axis is close to 0°. FIG. 10A is a sectional view looked from the direction of the substrate surface, and FIG. 10B is a plan view looked from the direction perpendicular to the substrate surface.

From the above-mentioned results, it is seen that even when the degree of ellipticity is small at the vertical incidence it enlarges considerably due to the increase of the angle between the optic axis and the polarizing plane accompanied by the enlarging incident angle, which coincides well with the previous experimental results.

Here, the problem will be considered again referring to FIG. 8. The actually used PC substrate adopts the status marked by 81 in FIG. 81, namely, the optic axis is perpendicular to the base. Compared to this it is seen that, in the status marked by 88 in the figure, namely, that in which $\Phi = 90°$, or that in which the optic axis is parallel to the substrate, the degree of ellipticity is the smallest.

From the above described fact, it has been found out that, by fabricating a PC substrate whose angle $\Phi$ is nearly equal to 90°, a substrate having a smallest value of the degree of ellipticity can be obtained, and consequently a base capable of attaining a high C/N ratio can be realized.

COMPARATIVE EXAMPLE

A conventional injection-molded CP substrate was of a diameter of 120 mm and a thickness of 1.2 mm. The molten effluent amount of the resin was about 10 g./10 minutes (according to the condition 15 of the testing method of JIS-K 7210). The resin was melted at 280° C. and was injected into a metallic mold at 93° C. under an injection pressure of 1000 kg./cm$^2$. and was kept under a pressure of 600 kg./cm$^2$. for about 2 seconds to be molded.

SUBSTRATE MOLDING EXAMPLE OF FIRST EMBODIMENT

A metallic mold was evacuated with a vacuum pump and a PC resin melted at 310° C. in a molten effluent amount of 10 g./10 minutes was injected into the metallic mold at 93° C. under an injection pressure of 1500 kg./cm$^2$. and was kept under a pressure of 600 kg./cm$^2$. for about 3 seconds to be molded.

The influent speed at the time of the injection was higher than in the Comparative Example.

Figure 11:
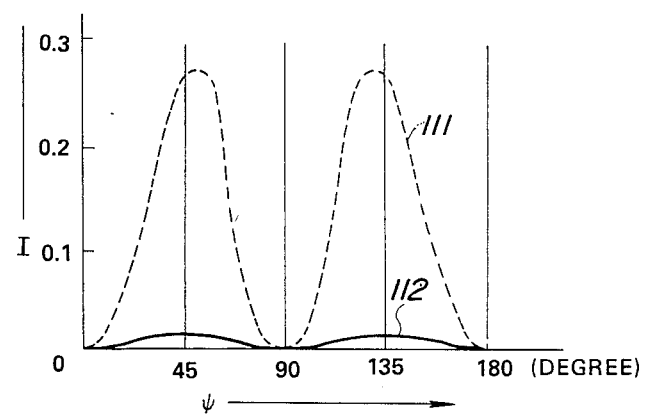

With respect to the PC substrates of the comparative example and the first embodiment the degree of a elipticity has been measured by the measuring device shown in FIG. 6A. FIG. 11 is a graph showing the actually measured data of the degree of ellipticity of the comparative example and the embodiment. Compared with the PC substrate 111 of the comparative example, it is seen that the PC substrate 112 of the embodiment has a markedly small degree of ellipticity even when the light beam is inclined with a certain incident angle, and the status of its $\Phi$ is close to 90°. That is to say, it is seen that its optic axis is approximately parallel to the substrate's surface and the direction is approximately arranged in the radial direction.

Figure 12:
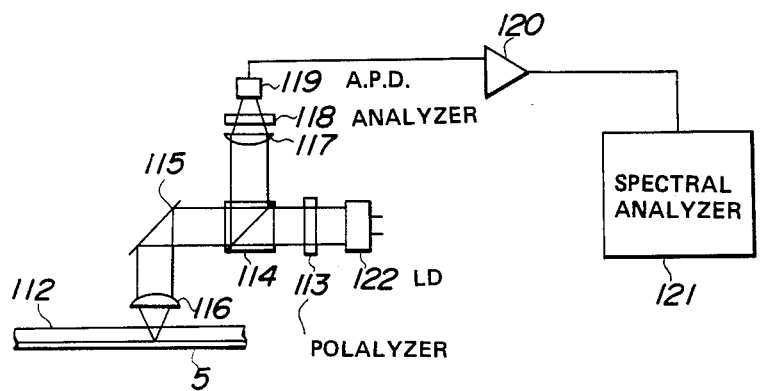
Figure 13:
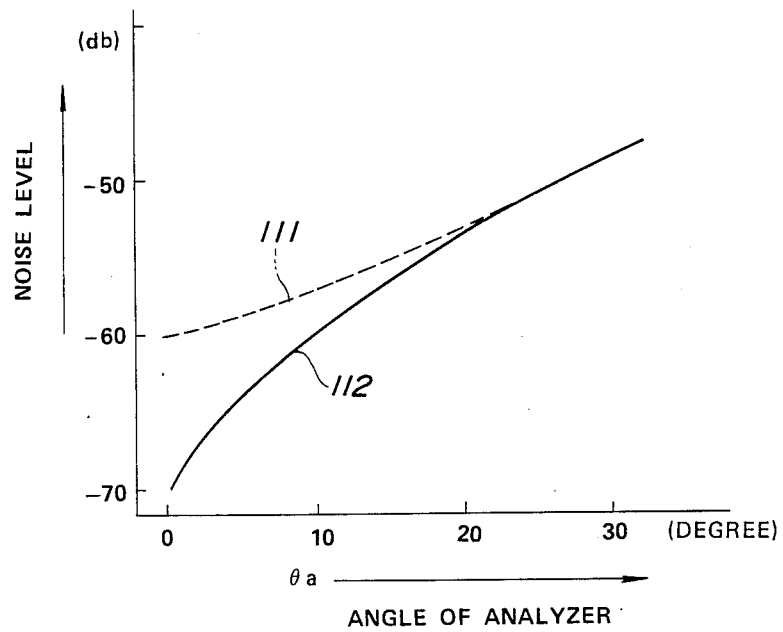

FIG. 12 is a schematic constitutional view of the measuring device by which the noise level of the PC substrate 112 of the above-mentioned embodiment has been measured. A light beam is incident on the substrate 112 from the opposite side of the reflecting film 5. The light beam is generated in a semiconductor laser 122, led through a polarizer 113 and semi-transparent mirror 114 and is reflected by a mirror 115, condensed by a lens 116 and irradiated on the substrate 112. The reflected light from the reflecting film 5 retrogresses the light path, and it is reflected by the semi-transparent mirror 114, led through a condenser 117 and an analyzer 118 and is detected by an avalanche photodiode (APD) 119 and is input to a spectral analyzer 121 via a pre-amplifier 120. In the measurement, an unmodulated laser beam reflected from the reflecting film 5 is detected by the APD while the angle of the analyser 118 is being varied, and among the detected outputs frequency band of 1 MHz±30 KHz is extracted by the spectral analyzer as the noise band. FIG. 13 shows the measured results of the noise level. It is seen that the noise level of the embodiment 112 is, compared with that of the comparative example, lowered by more than 8 dB at maximum. Meanwhile the abscissa of the figure indicates the angle $\theta a$ of the analyzer with respect to that of the polarizer 113 which is set at 90°; for example, if $\theta a = 0°$ it indicates that the polarizer and the analyzer are in a status of crossed nicols. The ordinate indicates the noise level.

Now, the results of measuring C/N on the substrates of the comparative example and first embodiment are as follows. That is to say, C/N was 35 dB in the comparative example but was 41 dB in the first embodiment.

Here, Gd-Te-Fe (composition ratio, 14:12:74) film 1000 Å in thickness is sputtered at high frequency to the both substrates, on which protectives film of SiO of 1000 Å in thickness is coated additionally. The C/N ratios of these substrates are measured at the position of about 100 mm in diameter. The frequency is set at 1 MHz and the angle of the analyzer at 6°.

A big improvement of 6 dB in the C/N ratio is perceived between the comparative example and the embodiment. According to the above embodiment, it is understood that the substrate 112 in which the optic axis is approximately parallel to the base surface and is almost arranged in the ratial direction can be obtained with ease.

In the description of the above-mentioned embodiment PC resin is employed as the material of the substrate, however, not only PC resin but also PVC (polyvinyl chloride) and PS (polystyrene) having high double refraction can achieve similar effect to the above-mentioned embodiment.

As a result of repeating various molding experiments, it has been found that the molding conditions for making a PC substrate of $\Phi$ near 90° can be attained also by the following conditions.

Seeking after the ad hoc molding conditions, various sorts of molding experiments were repeated, and the following conditions have been found out as achievable ones.

1. To diminish the molecular weight of resin, and to increase the influent speed of resin into the cavity of mold.
2. To make the pressure holding time after the completion of injection as short as possible, and to release the mold locking pressure rapidly.

As for the condition 1, from the point of view of durability the molecular weight cannot be diminished too low. At least, not less than 10,000 molecular weight is needed.

As for the condition 2, pressure holding is necessary to improve the transferability of tracking grooves and cannot be dispensed with. However, since it is one of the causes of increasing double refraction, shortening of the pressure holding time should preferably done as far as possible.

Furthermore the above-mentioned conditions 1 and 2 are not entirely independent, but their various relationships mutually affect the double refraction delicately.

Next, a comparative example employing a conventional molding method in which the angle $\Phi$ is totally neglected, and the embodiment of the present invention realizing a PC substrate whose Φ is nearly equal to 90°, are described in the following.

COMPARATIVE EXAMPLE

The dimensions of a molded substrate are 120 mm in diameter and 1.2 mm in thickness, and the resin used in the molding of this substrate polycarbonate resin 2,2 bis 4-hydroxi diphenyl)propane having average molecular weight 20,000 is melted at 300° C.

The molding is done with the injection cylinder-temperature of molding machine being set at 350° C., the mold temperature at 93° C., and the influent speed of resin into mold cavity at 90 ml/sec. After the completion of injection the substrate is held at 600 kg/cm$^2$ during two seconds and then the mold locking pressure is diminished from 100 ton/cm$^2$ to zero during four seconds.

SUBSTRATE MOLDING EXAMPLE OF SECOND EMBODIMENT

The same molding machine as the comparative example has been employed and polycarbonate resin having average molecular weight 12,000 has been used. The influent speed of resin into the cavity is 150 ml/sec, pressure holding time after the completion of injection is 0.5 second, and other conditions are same as in the comparative example.

This second embodiment has the same effect as of the above described first embodiment with respect to heightening the C/N ratio.

In the meantime the direction of the polarizing plane of the incident light crosses at right angle the radial direction of the substrate in the two above-mentioned embodiments, but if the direction of the former is in the radial direction, it is all right if the substrate is so fabricated that the optic axis of the substrate is parallel to the substrate surface and it crosses the radial direction at right angle.

Moreover, the direction of the optic axis is not necessarily to be fixed in the direction perpendicular to the direction of the polarizing plane of the incident light, but it can also be set at the direction parallel to the latter.

Furthermore, although the above-mentioned embodiment is described about a disc type substrate, the present invention can also be applied to a card type substrate for recording media of card type. In this case, it is all right if the direction of optic axis is parallel to the plane surface of card and is also parallel or perpendicular to the direction of the polarized light of the light beam condensed and incident on the card. For the case in which the direction of the polarizing plane of the condensed light beam can be set arbitrarily such as to the direction perpendicular, parallel and other direction with respect to the recording track, the direction of the optic axis is simply required to be parallel to the surface of the card type substrate.

In the present invention, it is apparent that different types of embodiments can be constituted based on the present invention in wide range without departing from the spirit or range of the present invention. The present invention is not restricted by its particular aspects of embodiments except by the resitictions described in the annexed claims.

What is claimed is:

1. An optical information recording media substrate comprising: a plane shaped article molded from a thermo-plastic resin having optical anisotropic properties, said article including a plane surface, an optical recording media and an optic axis set in a direction approximately parallel to said plane surface, whereby a light beam perpendicular to said plane surface is condensed and transmitted through said plane surface and led to a recording surface formed on said optical recording media.

2. A substrate according to claim 1, wherein said optic axis is set in a direction approximately perpendicular to the direction of a polarized light plane of a light beam condensed on said substrate and transmitted through said substrate.

3. A substrate according to claim 1, wherein said optic axis is set in a direction approximately parallel to the direction of a polarized light plane of a light beam condensed on said substrate and transmitted through said substrate.

4. A substrate according to claim 2 or claim 3, wherein said article is formed in the shape of a disc and the optic axis of said disc is set in the radial direction of said disc.

5. A method of recording optical information comprising the steps of:

providing a plane shaped molded thermoplastic resin article having optical anisotropic characteristics plane surface, an optic axis approximately parallel to said plane surface, and an optical recording media plane, providing a light beam, transmitting said light beam in a direction perpendicular to said plane surface of said article, condensing said light beam and transmitting said condensed light beam through said plane surface to a surface of said optical recording media provided therein.

* * * * *